United States Patent Office 3,402,138
Patented Sept. 17, 1968

3,402,138
STOPPING AGENTS FOR EMULSION POLYMERI-
ZATION PROCESSES COMPRISING N,N' - DIAL-
KYL-N,N'-METHYLENEBISHYDROXYLAMINES
Harry Elmer Albert and Paul Gordon Haines, Lafayette
Hill, Pa., assignors to Pennsalt Chemicals Corporation,
Philadelphia, Pa., a corporation of Pennsylvania
No Drawing. Filed Mar. 2, 1966, Ser. No. 531,023
10 Claims. (Cl. 260—29.7)

ABSTRACT OF THE DISCLOSURE

The use of an N,N'-dialkyl-N,N'-methylenebishydroxylamine for short-stopping polymerization processes employing ethylenically unsaturated monomers and deals particularly with those polymerization processes for making synthetic rubber latices.

Synthetic rubber latices are prepared commercially by emulsion polymerization of rubber-forming monomers and the polymerization must be stopped to give a product of desired optimum characteristics. Much study has been made toward finding good short-stops and numerous compounds have been found quite useful. However, the compounds used heretofore have certain disadvantages and are not generally satisfactory with all types of polymerization systems. For example, hydroquinone has been used in hot butadiene styrene systems, but it does not satifactorily short-stop cold rubber polymerization processes where a powerful initiator (e.g., hydroperoxide) is used for low temperature polymerizations. Although dinitrochlorobenzene has been used in cold rubber processes, it has the severe disadvantage of causing discoloration of the rubber; it is also water-insoluble and so toxic as to be a serious health problem to workers in the plant. The alkali metal salts, particularly the sodium salts of di-lower-alkyl dithiocarbamates (e.g. dimethyl-dithiocarbamate) have been used quite successfully in both hot and cold polymerization recipes, but this compound has the disadvantage of being oxidized to thiuram disulfides which remain in the finished rubber and cause undesirable and uncontrollable variation in vulcanization rate. Hydroxylamine and hydroxylamine salts such as the sulfate and hydrochloride have also been disclosed as short-stops for persulfate catalyzed emulsion polymerization processes (see U.S.P. 2,444,801), but they are not considered sufficiently effective for commercial use in cold polymerization recipes. It is also known from U.S. 3,222,334 that N,N-dialkyl hydroxylamines are excellent short-stops which are effective for both hot and cold emulsion polymerization processes and such N,N-dialkyl hydroxylamines are significantly more effective than hydroxylamines are significantly more effective than hydroxylamine or its salts. Further, the N,N-dialkyl-hydroxylamines are non-toxic and have no effect on the processed and cured rubber products in which they are used.

It has now been found that methylenebishydroxylamine compounds are also excellent short-stopping agents where such compounds have the structure:

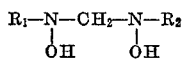

where $R_1$ and $R_2$ are alkyl or cycloakyl groups containing up to about six carbon atoms. These compounds do not discolor the rubber product nor do they have any effect on the cure.

In carrying out the process of this invention, conventional polymerization recipes may be used and the short-stop added in the usual manner. For example, hot synthetic rubber recipes (persulfate or azonitrile initiated) or cold synthetic rubber recipes (hydroperoxide initiated) may be used. The polymerizable material for preparing synthetic rubber latices may be, as is well known, any one or more conjugated diolefins or their admixture with a copolymerizable monoolefin. The conjugated diolefines are exemplified by the butadienes such as butadiene-1,3, isoprene, chloroprene, cyanobutadiene-1,3, 2-phenylbutadiene, piperylene, 2,3-dimethylbutadiene-1,3, and the like. The copolymerizable monomer, which will normally comprise up to about 70% of the mixture will be a monoolefin containing a single $CH_2 = C<$ group having at least one of the free valence bonds attached to an electro-negative group. Such olefins include aryl olefins such as styrene, vinyl naphthylene, a-methylstyrene, p-chlorostyrene, etc.; the a-methylene carboxylic acids and their esters, amides and nitriles such as acrylic acid, methylacrylic acid, acrylonitrile, methacrylamide, and the like. Thus, the synthetic rubber may be any butadiene polymer synthetic rubber latex. However, it will be understood that the methylenebishydroxylamines may also be used in accord with this invention to stop polymerization of other ethylenically unsaturated monomers which yield non-elastomeric latices. Thus, this invention may also be used in the polymerization of vinyl and vinylidene halides (e.g., vinyl chloride, vinylidene fluoride, etc.), acrylates, methacrylates and acrylamides (methyl acrylates, glycidyl methacrylate, methacrylamide, etc.), vinyl ester (e.g., vinyl acetate, etc.), and in fact in any addition polymerization system where polymerization proceeds through a free radical mechanism.

The addition of the shortstop agent will be made after the desired degree of polymerization has occurred. The amount added will be that required to retard or stop the polymerization as desired and the amount is not critical. However, the amount of agent usually used will be between about 0.01 and about 2.0 parts per hundred parts of monomer (phm.) with about 0.05 to about 0.2 phm. being preferred. As little as 0.001 phm. will show the effect, but for practical purposes at least about 0.020 phm. will be used. Using more than 2 phm. is not necessary and is wasteful of material.

The shortstops used in the process of this invention may be any N,N' - dialkyl - N,N' - methylenebishydroxylamine and the term alkyl is meant to include cycloalkyl. Because of the ready availability the dialkyl hydroxylamines containing up to about six carbon atoms in each alkyl group, such will be preferred, and it will be understood that each of the alkyl groups on the nitrogen atom of the hydroxylamine may be different. Specific compounds which are operable in this invention include N,N'-dimethyl-N,N'-methylenebishydroxylamine, N,N'-di-n-propyl-N,N'-methylenebishydroxylamine, N,N'-diisopropyl-N,N'-methylenebishydroxylamine, N,N'-di-normal butyl-N,N'-methylenebishydroxylamine, the N,N'-diamyl-N,N'-methylenebishydroxylamines, N,N' - dicyclohexyl-N,N'-methylenebishydroxylamine, N - methyl-N'-ethyl-N,N'-methylenebishydroxylamine, N - methyl-N-cyclohexyl-N, N'-methylenebishydroxylamine, and the like. The N,N'-dimethyl-N,N'-methylenebishydroxylamine compound is known and may be prepared by processes made as described by Ulrich and Sayigh, J. Chem. Soc., 1963, page 1098. The higher homologues which have not been reported heretofore can be prepared readily from cheap nitrocycloalkanes by reduction to the corresponding N-substituted-hydroxylamine followed by condensation with formaldehyde. The compounds of this class are stable solids having relatively high melting points.

Example 1.—Preparation of N,N'-diisopropyl-N,N'-methylenebishydroxylamine

A mixture of 24 g. (0.1 mole) of di(N-isopropylhydroxylammonium) oxalate, 40 ml. of deionized water, 15 ml. of methanol and 11.7 g. (0.11 mole) of anhydrous sodium carbonate was prepared. To this, 8.1 g. (0.1 mole) of 37% formaldehyde was added slowly with stirring. The reaction mixture was allowed to stand overnight. The sodium oxalate which had separated from the reaction mixture was filtered off and washed with chloroform. The filtrate was extracted with three 50 ml. portions of chloroform and the combined chloroform extracts were evaporated to dryness. A white solid weighing 4.5 g., M.P. 97–108° C., was obtained, which after three recrystallizations from acetone weighed 3.1 g. and had a melting point of 107–109° C.

*Analysis.*—Calculated for $C_7H_{18}N_2O_2$: C=51.85%, H=11.5%, N=17.29%. Found: C=52.1%, H=12.25%, N=16.9%.

An infrared spectrum showed no inconsistencies with the proposed structure.

Example 2.—Preparation of N,N'-dicyclohexyl-N,N'-methylenebishydroxylamine

A mixture of 8.5 g. (0.074 mole) of N-cyclohexylhydroxylamine, 80 ml. distilled water, 110 ml. methanol and 3 g. (0.037 mole) of 37% formaldehyde solution was heated at 65° C. for 45 minutes. One hundred ml. more of methanol was added and the reaction mixture stood overnight at room temperature.

The mixture was evaporated at 55° C. under reduced pressure to give a residue of liquid and crystals which was extracted with 1500 ml. boiling n-hexane. Concentration of the extract to one-fifth volume gave crude crystalline product which was crystallized from hexane to give 1.6 g. crystals melting at 71–73° C. and analyzing 64.7% C, 10.3% H and 11.4% N. Theory for $C_{13}H_{26}N_2O_2$ is 64.5% C, 10.7% H and 11.6% N.

Evaluation of compounds

The test recipe used for evaluating these compounds as stopping agents is a sodium formaldehyde sulfoxylate (SFS) recipe similar to one given in "Synthetic Rubber" by Whitby (page 217). The composition of the recipe used in this work for a 7 oz. bottle loading is as follows:

|   | G. |
|---|---|
| Butadiene | 18 |
| Styrene | 7 |
| Water | 50 |
| t-Dodecyl mercaptan | 0.058 |
| Dresinate 515 [a] | 1.125 |
| Daxad 11 [b] | 0.038 |
| Versene 100 [c] | 0.008 |
| p-Menthane hydroperoxide [d] | 0.011 |
| $FeSO_4 \cdot 7H_2O$ | 0.0056 |
| $Na_3PO_4 \cdot 12H_2O$ | 0.20 |
| Sodium formaldehyde sulfoxylate | 0.0169 |

[a] Hercules Powder Co., potassium salt of disproportionated rosin acids, 80% solids. Amount given in recipe is on a 100% basis.
[b] Dewey and Almy Chemical Co., dispersing agent, sodium salt of polymerized alkylnaphthalene sulfonate.
[c] Dow Chemical Co., sequestering agent, tetrasodium salt of ethylenediamine tetraacetic acid, 39% aqueous solution. Amount given in recipe is on a 100% basis.
[d] Hercules Powder Co., 50% active ingredient. Amount given in recipe is on a 100% basis.

The seven ounce polymerization bottles are loaded with all of the ingredients except the p-menthane hydroperoxide and then are capped with a perforated crown cap having a 3/16" opening and a self-sealing liner to allow catalyst injection and sampling of the latex with a hypodermic syringe as polymerization proceeds. The loaded bottles are placed in a thermostatically controlled polymerizer bath held at 5° C. They are positioned so that rotation of the shaft of the polymerizer rotates the bottles end over end to provide suitable agitation. After cooling in the polymerizer for about 10 minutes, a styrene solution containing 1.1% by weight of p-menthane hydroperoxide is injected by a hypodermic syringe to initiate polymerization. The progress of the polymerization is followed by taking the total solids of latex samples obtained by using a hypodermic syringe, these total solids being related to the percent conversion of the monomers by a simple formula. At a conversion of about 55% the stopping agent is injected by a hypodermic syringe, a dilute aqueous solution usually being employed for this purpose. The conversion is then determined after 1 hour at 5° C. and after 18 and 24 hours at 50° C. to determine the effectiveness of the stopping agent. An effective stopping agent allows little or no rise in conversion under these test conditions.

The following tables illustrate the effectiveness of the compounds as stopping agents:

TABLE I.—EVALUATION OF N,N'-DIMETHYL-N,N'-METHYLENEBISHYDROXYLAMINE AS A STOPPING AGENT FOR SBR POLYMERIZATION

| Stopping Agent | Concn., phm.[a] | Percent Conversion | | | |
|---|---|---|---|---|---|
| | | When stopped | After 1 hr. at 50° C. | After 18 hrs. at 50° C. | After 24 hrs. at 50° C. |
| None | | 53.9 | | 92.1 | 93.7 |
| N,N'-dimethyl-N,N'-methylene-bishydroxylamino | 0.15 | 53.9 | 53.2 | 52.9 | 52.5 |
| Do | 0.02 | 53.9 | 54.2 | 56.0 | 56.7 |

[a] Parts of stopping agent per 100 parts of monomer.

TABLE II.—EVALUATION OF N,N'-DIISOPROPYL-N,N'-METHYLENEBISHYDROXYLAMINE AS A STOPPING AGENT FOR SBR POLYMERIZATION

| Stopping Agent | Concn., phm. | Percent Conversion | | | |
|---|---|---|---|---|---|
| | | When stopped | After 1 hr. at 50° C. | After 18 hrs. at 50° C. | After 24 hrs. at 50° C. |
| None | | 53.7 | | 89.3 | 90.3 |
| N,N'-diisopropyl-N,N'-methylene-bishydroxylamino | 0.15 | 53.7 | 54.3 | 54.2 | 54.2 |
| Do | 0.02 | 53.7 | 54.1 | 54.2 | 54.3 |

TABLE III.—EVALUATION OF N,N'-DICYCLOHEXYL-N,N'-METHYLENEBISHYDROXYLAMINE AS A STOPPING AGENT FOR SBR POLYMERIZATION

| Stopping Agent | Concn., phm. | Percent Conversion | | | |
|---|---|---|---|---|---|
| | | When stopped | After 1 hr. at 50° C. | After 18 hrs. at 50° C. | After 24 hrs. at 50° C. |
| None | | 55.6 | | 93.7 | 90.3 |
| N,N'-Dicyclohexyl-N,N'-methylene-bishydroxylamino | 0.15 | 55.6 | 54.7 | 54.4 | 55.3 |

The results summarized in Tables I and II show N,N'-dimethyl-N,N'-methylenebishydroxylamine and N,N'-diisopropyl-N,N'-methylenebishydroxylamine to be active even at a concentration as low as 0.02 part per hundred parts of monomer. Sodium dimethyldithiocarbamate, a stopping agent widely used commercially, is usually employed at a concentration of about 0.15 phm. These results show that these compounds can be justly classified as extremely active stopping agents.

In Table III, N,N'-dicyclohexyl-N,N'-methylenebishydroxylamine is shown to be a very active stopping agent at 0.15 phm.

It is apparent from the above description of the invention and from the experimental data shown that the use of N,N'-dialkyl-N,N'-methylenebishydroxylamines as short stops in the preparation of synthetic polymers permits excellent control of the polymerization process, providing a sure and effective means for stopping the process when desired. These and other advantages of the agents, particularly with regard to (a) their versatility for both hot and cold synthetic rubber recipes, (b) their non-toxic nature, (c) their effectiveness at low concentration, (d) their compatibility with the finished rubber product, and (e) their innocuous effects on the rubber make it obvious that this invention is a significant advance in the art of polymer science.

It will be understood that numerous changes and variations may be made from the above description and examples without departing from the spirit and scope of the invention.

We claim:

1. In the process for preparing a synthetic rubber latex by polymerizing a conjugated diolefin and terminating the polymerization by the addition of a stopping agent, the improvement which comprises using as said stopping agent an N,N'-dialkyl-N,N'-methylenebishydroxylamine containing from one to six carbon atoms in each alkyl group.

2. The process of claim 1 wherein the conjugated diolefin is a butadiene polymer synthetic rubber latex.

3. The process of claim 1 wherein the butadiene polymer is a copolymer of styrene and butadiene.

4. The process of claim 1 wherein the stopping agent is N,N'-dimethyl-N,N'-methylenebishydroxylamine.

5. The process of claim 1 wherein the stopping agent is N,N'-diisopropyl-N,N'-methylenebishydroxylamine.

6. The process of claim 1 wherein the active agent is N,N'-dicyclohexyl-N,N'-methylenebishydroxylamine.

7. In the process of preparing a cold butadiene styrene synthetic rubber latex by addition polymerization through a free radical mechanism, the improvement which comprises a step of stopping the polymerization with from about 0.01 to 0.1 phm. of an N,N'-dialkyl-N,N'-methylenebishydroxylamine which contains from one to six carbon atoms in each alkyl group.

8. The process of claim 7 wherein the stopping agent is N,N'-dimethyl-N,N'-methylenebishydroxylamine.

9. The process of claim 7 wherein the stopping agent is N,N'-diisopropyl-N,N'-methylenebishydroxylamine.

10. The process of claim 7 wherein the stopping agent is N,N'-dicyclohexyl-N,N'-methylenebishydroxylamine.

References Cited

UNITED STATES PATENTS 3,222,334  12/1965  Demme _____ 260—84.7

MURRAY TILLMAN, *Primary Examiner.*

W. J. BRIGGS, *Assistant Examiner.*